US012634821B2

(12) United States Patent
Han et al.

(10) Patent No.: US 12,634,821 B2
(45) Date of Patent: May 19, 2026

(54) MANAGING WAKE SCHEDULES FOR CLIENT DEVICES BASED ON DATA TRAFFIC

(71) Applicant: HEWLETT PACKARD ENTERPRISE DEVELOPMENT LP, Spring, TX (US)

(72) Inventors: Jianpo Han, Beijing (CN); Jiaqi Li, Beijing (CN); Liao Xu, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 342 days.

(21) Appl. No.: 18/360,043

(22) Filed: Jul. 27, 2023

(65) Prior Publication Data

US 2025/0039785 A1      Jan. 30, 2025

(51) Int. Cl.
H04W 52/02         (2009.01)
(52) U.S. Cl.
CPC ...  H04W 52/0216 (2013.01); H04W 52/0219 (2013.01)
(58) Field of Classification Search
None
See application file for complete search history.

(56) References Cited

U.S. PATENT DOCUMENTS

2018/0288702 A1* 10/2018 Kang ............... H04W 52/0225
2019/0052413 A1*  2/2019 Babaei .................. H04L 1/1854

2021/0297949 A1*  9/2021 Liu ..................... H04W 56/001
2022/0141680 A1*  5/2022 Min ....................... H04W 28/02
2023/0403739 A1* 12/2023 Baek ................. H04W 74/0875
2024/0137982 A1*  4/2024 Chu ................... H04W 74/0816
2025/0294633 A1*  9/2025 Lu ........................... H04W 76/15

OTHER PUBLICATIONS

U.S. Appl. No. 63/380,430 Provisional Application filed Oct. 21, 2022. (Year: 2022).*

* cited by examiner

*Primary Examiner* — Andre Tacdiran
(74) *Attorney, Agent, or Firm* — Hewlett Packard Enterprise Patent Department

(57)         ABSTRACT

An example method for managing wake schedules of client devices is presented. A wireless networking device determines a value of a data traffic characteristic of a client device based on monitoring of data traffic associated with the client device. If it is determined that the client device is capable of implementing the TWT mechanism, the wireless networking device may set a wake schedule for the client device based on the value of the data traffic characteristic. Once the wake schedule is set, the wireless networking device communicates with the client device as per the wake schedule. In some examples, the wireless networking device may set custom wake schedules for different client devices when the client devices have different behaviors for the same data traffic characteristic. Further, in certain examples, the wireless networking device may even set custom wake schedules for different activity periods for the same client device.

17 Claims, 9 Drawing Sheets

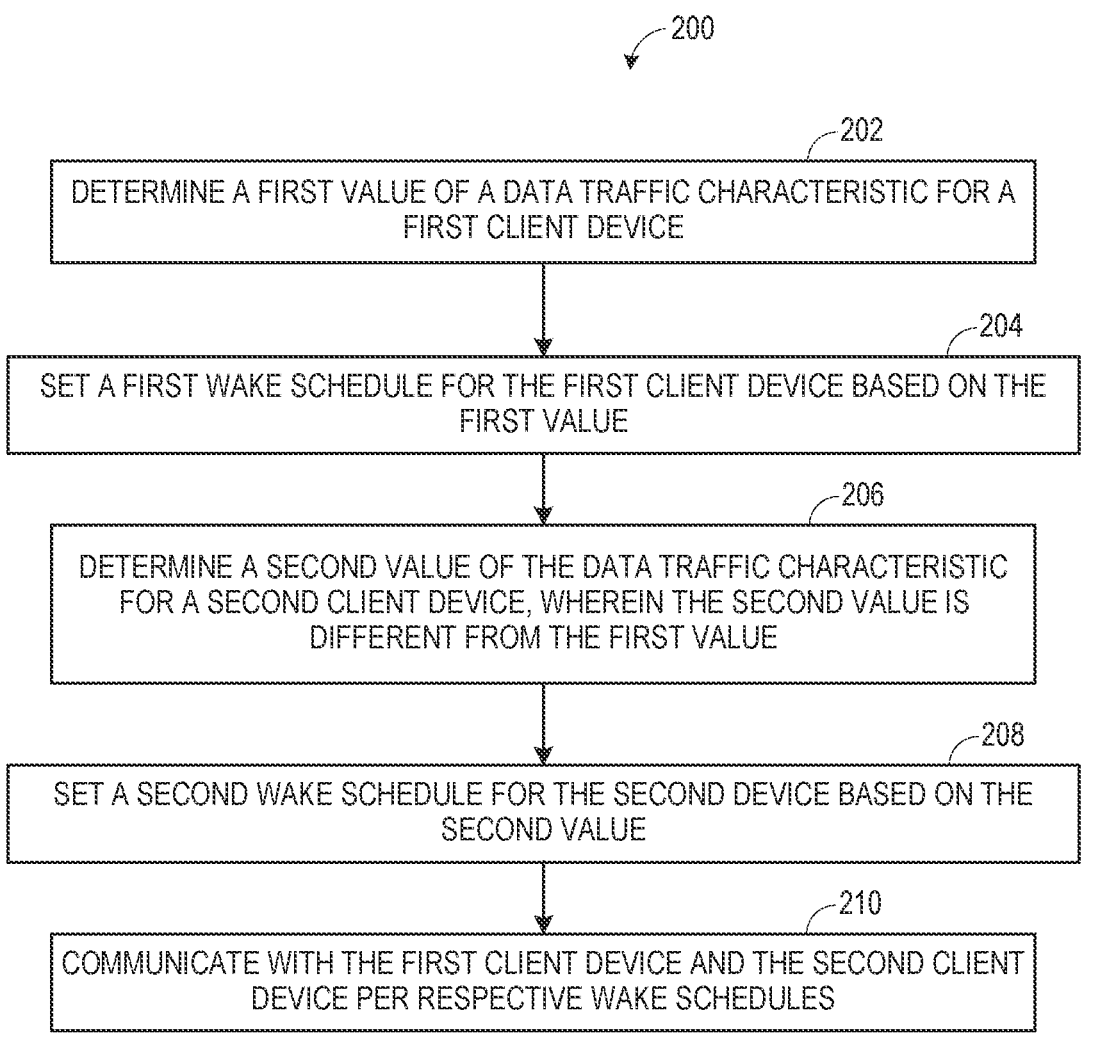

DETERMINE A FIRST VALUE OF A DATA TRAFFIC CHARACTERISTIC FOR A
FIRST CLIENT DEVICE

SET A FIRST WAKE SCHEDULE FOR THE FIRST CLIENT DEVICE BASED ON THE
FIRST VALUE

DETERMINE A SECOND VALUE OF THE DATA TRAFFIC CHARACTERISTIC
FOR A SECOND CLIENT DEVICE, WHEREIN THE SECOND VALUE IS
DIFFERENT FROM THE FIRST VALUE

SET A SECOND WAKE SCHEDULE FOR THE SECOND DEVICE BASED ON THE
SECOND VALUE

COMMUNICATE WITH THE FIRST CLIENT DEVICE AND THE SECOND CLIENT
DEVICE PER RESPECTIVE WAKE SCHEDULES

*FIG. 2*

MANAGING WAKE SCHEDULES FOR CLIENT DEVICES BASED ON DATA TRAFFIC

BACKGROUND

Today, wireless devices are ubiquitous. From printers and smart televisions to Internet of Things (IoT) devices many devices vie for connection to wireless networks. Some of these devices operate on batteries with limited stored energy. The newer generations of Wi-Fi standards have introduced a range of technologies that can reduce power consumption to address challenges associated with operating devices with limited stored energy. Target Wake Time (TWT) and Restricted-TWT (R-TWT) (hereinafter collectively referred to as TWT mechanisms) are some example mechanisms defined in the newer Wi-Fi standards aimed toward reducing power consumption. The TWT mechanisms allow wireless networking devices such as access points to use enhanced medium access protection and resource reservation to provide predictable latency with higher reliability for latency-sensitive traffic over a wireless link. In particular, the TWT mechanisms can enable access points and devices to negotiate and define specific times for the devices to wake up from their power save modes and access a communication medium. Thus, TWT can significantly increase device sleep time, thereby reducing power consumption.

BRIEF DESCRIPTION OF THE DRAWINGS

One or more examples in the present disclosure are described in detail with reference to the following Figures. The Figures are provided for purposes of illustration only and merely depict examples.

FIG. 2 depicts a flowchart of an example method for setting up customized wake schedules for different client devices based on respective data traffic analysis.

Figure 1:
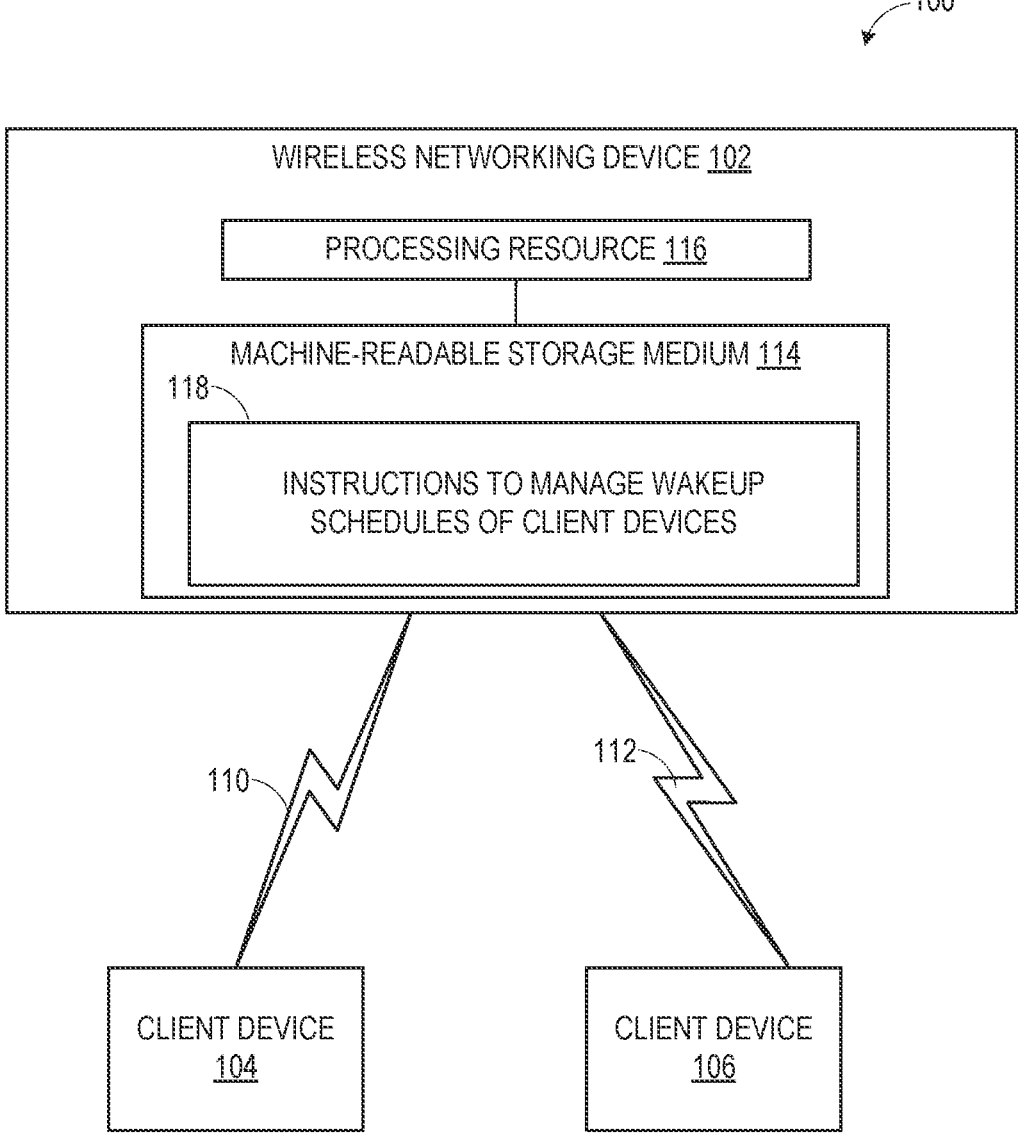
FIG. 1 depicts a block diagram of a networked system in which various of the examples presented herein may be implemented.

The Figures are not exhaustive and do not limit the present disclosure to the precise form disclosed.

DETAILED DESCRIPTION

The Institute of Electrical and Electronics Engineers (IEEE) 802.11 ax defines a TWT mechanism and the IEEE 802.1 be defines an R-TWT mechanism aimed to save power consumption in battery-powered wireless devices also referred to as stations (STAs) or client devices. These TWT mechanisms enable client devices to determine when, and how frequently, the client devices will wake up to send and/or receive data. Using the TWT mechanisms, an access point (AP) and a client device can negotiate specific service periods (e.g., also referred to as TWT service periods or Wake Durations) during which client devices can wake up from a power save mode and communicate with the AP. When outside of the service periods, the client devices can be put in the power save mode to reduce power consumption or perform off-channel operations. In addition to the reduced power consumption, the negotiated service periods can allow the AP to manage the activities of the client devices by scheduling the client devices to operate at different times and, therefore, minimize contention between the client devices.

The TWT mechanisms offer two broad categories of agreements—an individual TWT and a broadcast TWT. Under the individual TWT, a service period can be negotiated on a per-station basis and each client device can set its service period. Under the broadcast TWT, the AP can set the service periods for a group of client devices collectively by broadcasting TWT parameters to the group of client devices. Each client device can choose whether or not to subscribe to the schedule specified in the TWT parameters.

As it is apparent, the data traffic of a given client device is dependent on applications that are running on the client device. For instance, applications that entail video multi-cast have traffic that is mostly downlink, periodic, and real-time in nature. If the client devices are not aware of when to wake up or are configured with TWT parameters that are outdated may negatively impact the client device's performance. For instance, a client device waking up too frequently may waste power, whereas a client device waking up infrequently will introduce a jitter. As such, setting up the right set of TWT parameters is an ongoing challenge.

To solve this issue, a wireless networking device (e.g., AP), in examples consistent with the teachings of this disclosure, is configured with the capability to analyze the traffic pattern of its associated client devices. With broader knowledge of the client device's traffic pattern, the wireless networking device may intelligently guide the client device to wake up and sleep for data communication causing minimal to no jitter while efficiently reducing power consumption. In accordance with an example, the proposed wireless networking device determines a value of a data traffic characteristic of a client device based on data traffic associated with the client device. The wireless networking device may implement deep packet inspection (DPI), and determine data traffic characteristics such as burst interval, burst duration, average bandwidth, application type, and quality of service (QoS) requirement of the client device.

Based on the measures of one or more data traffic characteristics, the wireless networking device may first determine if the client device is capable of implementing a TWT mechanism. If it is determined that the client device is capable of implementing the TWT mechanism, the wireless networking device may set a wake schedule for the client device based on the value of the data traffic characteristic. The wake schedule may be defined using parameters such as wake duration and wake interval. The wake duration may refer to a period for which a client device remains active for wireless communication. Further, the wake interval may refer to a time duration after the completion of the wake duration at which the client device again wakes up to communicate with the wireless networking device. In particular, the wireless networking device may determine the wake duration and the wake interval of the client device based on the burst interval and the burst duration of the data traffic. In one example, the wake duration may be set to a value higher than the burst duration so that the client devices have time sufficient to complete the data transfer. Also, the wake interval of the client device is set the same as the burst interval so that the client device wakes up in synchronization with the burst interval of the client device's data traffic. Once the wake schedule is set, the wireless networking device communicates with the client device as per the wake schedule.

In one example implementation, the wireless networking device may set different (i.e., custom) wake schedules for different client devices (e.g., a first client device and a second client device) when the client devices have different behaviors for the same data traffic characteristic. To that end, the wireless networking device may calculate a first value of a data traffic characteristic corresponding to the first client device and set a first wake schedule for the first client device based on the first value. Upon observing that the second client device has a different second value for the same data traffic characteristic, the wireless networking device sets a second wake schedule for the second client device based on the second value. The wireless networking device may then communicate with the first client device per the first wake schedule and the second client device per the second wake schedule.

In some instances, it may be possible that a given client device may run different applications at different periods causing a change in the client device's data traffic pattern. In accordance with an implementation, the wireless networking device may set different (i.e., custom) wake schedules for different activity periods (e.g., a first period and a second period) for the same client device. To that end, the wireless networking device may determine a value of a data traffic characteristic corresponding to the client device for the first period (hereinafter referred to as a first-period traffic characteristic value) and set a first wake schedule for the first period based on the first-period traffic characteristic value. Further, during operation, the wireless networking device may determine another value of the data traffic characteristic corresponding to the client device for a second period (hereinafter referred to as a second-period traffic characteristic value). Upon determining that the second-period traffic characteristic value is different from the first-period traffic characteristic value, the wireless networking device may set a second wake schedule for the second period based on the second-period traffic characteristic value.

As will be appreciated, such a setting of the wake schedules may allow the client device to wake up in synchronization with the data traffic characteristics of the client device and have sufficient time to complete data transfer. Such an efficient data transfer and wake schedule may reduce the power consumption of the client device with minimal to no jitter.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed systems and methods in detail, it is useful to describe an example network installation with which these systems and methods might be implemented in various applications. FIG. 1 illustrates a system 100 in which various of the examples presented herein may be implemented. The system 100 may be implemented in any setup for example, in a home setup or an organization, such as a business, educational institution, governmental entity, healthcare facility, or other organization. The system 100 depicts a network of devices (hereinafter referred to as network devices) for example, a wireless networking device 102 and a plurality of client devices, for example, client devices 104 and 106. The system 100 may include a greater or fewer number of wireless networking devices than depicted in FIG. 1.

The client devices 104, 106 may be electronic devices capable of wirelessly communicating with a wireless networking device 102 or other electronic devices. Examples of client devices 104, 106 may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, smart terminals, dumb terminals, virtual terminals, video game consoles, virtual assistants, Internet of Things (IoT) devices, and the like.

The client devices 104 and 106 may communicate with the wireless networking device 102 over respective communication links 110 and 112. In an example implementation, the communication links 110 and 112 may be wireless connections established between the wireless networking device 102 and the client devices 104 and 106 according to the wireless communication protocols such as 802.11 standards, Wi-Fi Alliance Specifications, or any other wireless communication standards. In some examples, the communications over the communication links 110 and 112 may be carried out in compliance with IEEE 802.11ax and/or IEEE 802.11be Specifications. In certain other examples, the communication links 110 and 112 may include telecommunication lines, such as phone lines, broadcast coaxial cables, fiber optic cables, satellite communications, cellular communications, and the like. In some examples, the communication links 110 and 112 may include any number of intermediate network devices, such as switches, routers, gateways, servers, and/or controllers.

The wireless networking device 102 may be a combination of hardware, software, and/or firmware that is configured to provide wireless network connectivity to the client devices 104, 106. In some examples, the wireless networking device 102 may comprise, be implemented as, or known as a radio router, radio transceiver, a switch, a Wi-Fi hotspot device, Basic Service Set (BSS) device, Extended Service Set (ESS) device, radio base station (RBS), or some other terminology and may act as a point of network access for the client devices 104, 106. In one example implementation, the wireless networking device 102 may be a wireless access point also referred to as an access point (AP). Although not shown, in some examples, the system 100 may include additional network devices such as, but not limited to, additional APs, wireless local area network (WLAN) controllers, network switches, gateway devices, routers, and the like. Via the wireless networking device 102, the client devices 104, 106 may communicate with each other and/or with any other network device to which the wireless networking device 102 is communicatively connected (e.g., the network switches, the WLAN controller, and/or gateway devices).

In accordance with examples consistent with the teachings of this disclosure, the wireless networking device 102 may be configured to manage the wake schedules of one or more of the client devices 104, 106 based on data traffic conditions associated with the client devices 104, 106. In particular, the wireless networking device 102 may intelligently guide the client devices 104, 106 to wake up and sleep for data communication causing minimal to no jitter while efficiently reducing power consumption. In some examples, for the wireless networking device 102 to accomplish these objectives, the wireless networking device 102 may include a machine-readable storage medium 114, and a processing resource 116 coupled to the machine-readable storage medium 114.

The machine-readable storage medium 114 may be non-transitory and is alternatively referred to as a non-transitory machine-readable storage medium that does not encompass transitory propagating signals. The machine-readable storage medium 114 may be any electronic, magnetic, optical, or other type of storage device that may store data and/or executable instructions. Examples of the machine-readable storage medium 114 may include Random Access Memory (RAM), non-volatile RAM (NVRAM), an Electrically Erasable Programmable Read-Only Memory (EEPROM), a storage drive (e.g., a solid-state drive (SSD) or a hard disk drive (HDD)), a flash memory, and the like. The machine-readable storage medium 114 may be encoded with instructions 118 to manage the wake schedules of one or more of the client devices 104, 106. Although not shown, in some examples, the machine-readable storage medium 114 may be encoded with certain additional executable instructions to perform any other operations performed by the wireless networking device 102, without limiting the scope of the present disclosure.

The processing resource 116 may be a physical device, for example, a central processing unit (CPU), a microprocessor, a graphics processing unit (GPU), a field-programmable gate array (FPGA), application-specific integrated circuit (ASIC), other hardware devices capable of retrieving and executing instructions stored in the machine-readable storage medium 114, or combinations thereof. The processing resource 116 may fetch, decode, and execute the instructions 118 stored in the machine-readable storage medium 114 to manage the wake schedules of the client devices 104, 106. As an alternative or in addition to executing the instructions 118, the processing resource 116 may include at least one integrated circuit (IC), control logic, electronic circuits, or combinations thereof that include several electronic components for performing the functionalities intended to be performed by the wireless networking device 102.

In accordance with some examples, the wireless networking device 102 may implement, by way of the processing resource 116 executing the instructions 118, a method of managing the wake schedules of the client devices 104, 106. The processing resource 116 may execute one or more of the instructions 118 to perform the method steps described in conjunction with FIGS. 2, 3A, 3B, 4, 5A, and 5B, described later.

In some examples, the processing resource 116 may execute one or more of the instructions 118 to determine whether a given client device (e.g., the client devices 104, 106) is capable of implementing a TWT mechanism based on a value of a data traffic characteristic associated with the given client device. For example, the data traffic characteristic for a given client device may be a parameter that is indicative of the periodicity of the data traffic of the given client device. Examples of the data traffic characteristic may be a burst interval, a burst duration, an average bandwidth, an application type, or a quality of service (QoS) requirement. Responsive to determining that the given client device is capable of implementing the TWT mechanism, the wireless networking device 102 may set a wake schedule for the given client device based on the value of the data traffic characteristic. In particular, the wireless networking device 102 may determine a wake duration and a wake interval of the given client device based on the data traffic characteristics such as the burst interval and the burst duration of the data traffic. Once the wake schedule is set, the wireless networking device 102 communicates with the given client device as per the set wake schedule.

In certain examples, the wireless networking device 102 may set custom (i.e., custom) wake schedules for each of the client devices 104 and 106 if the client devices 104, 106 have different behaviors for the same data traffic characteristic. The wireless networking device may then communicate with the client devices 104 and 106 per the respective custom wake schedules. Additional details of setting the custom wake schedules for the client devices 104 and 106 are described in conjunction with methods described in FIGS. 2, 3A, and 3B.

As it may be possible that the client devices 104 and/or 106 may run different applications at different periods causing a change in the respective data traffic patterns. In accordance with some examples, the wireless networking device 102, for a given client device of the client devices 104 and 106, may set custom wake schedules for different activity periods (e.g., a first period and a second period) if the given client device demonstrates different behaviors for the same data traffic characteristic during each such activity periods. As will be appreciated, such a setting of the wake schedules may allow the client devices to wake up in synchronization with the data traffic characteristics of the client device and have sufficient time to complete data transfer. Such an efficient data transfer and wake schedule may reduce the power consumption of the client device with minimal to no jitter.

In the description hereinafter, several of the operations performed by a wireless networking device, for example, the wireless networking device 102, are described with the help of flowcharts shown in FIGS. 2, 3A, 3B, 4, 5A, and 5B. In some examples, the operations described in these flowcharts may be performed by a processing resource (e.g., the processing resource 116) by executing instructions (e.g., the instructions 118) stored in the machine-readable storage medium (e.g., machine-readable storage medium 114). As an alternative or in addition to retrieving and executing instructions, the operations described in these flowcharts may be performed by implementing one or more electronic circuits that include electronic components such as an FPGA, ASIC, or other electronic circuits.

Referring now to FIG. 2, a flowchart of an example method 200 for managing wake schedules of client devices is depicted. In particular, the method 200 represents an example technique of setting up customized wake schedules for different client devices based on respective data traffic analysis. This helps the client devices in operating with minimal or no jitter while saving power in situations where the client devices have different behaviors for the same data traffic characteristic.

At step 202, the wireless networking device may determine a first value of a data traffic characteristic corresponding to a first client device (e.g., the client device 104). In particular, for the first client device, the wireless networking device may inspect its data traffic for a certain duration, also, referred to as a first monitoring phase. During the first monitoring phase, the wireless networking device may analyze the data traffic, for example, by applying the deep packet inspection techniques, to calculate values of one or more data traffic characteristics. Examples of the data traffic characteristics that the wireless networking device may determine include a burst interval, a burst duration, an average bandwidth, an application type, or a QoS require- ment. The term "burst duration" as used herein may refer to the duration for which a chunk of data (e.g., a set of data packets) is transmitted. Also, the term "burst interval" may refer to a duration between two consecutive chunks of data. The term "average bandwidth" as used herein may refer to the traffic data bytes transmitted per second. The term "application type" as used herein may refer to different traffic priorities such as "voice", "video," etc. The term "QoS requirement" as used herein may refer to the traffic latency or packet loss requirement for different kinds of traffic types.

One or more of these data traffic characteristics are indicative of a periodicity of data traffic. For example, the data traffic that has a uniform burst interval and the burst duration may be periodic. In addition, some applications demand periodic data transfers. Accordingly, knowing the application type may also be useful in determining whether the data traffic is periodic.

If the data traffic of the first client device is identified to be periodic based on the first data traffic characteristic, the wireless networking device may be configured to commu- nicate with the first client device as per a target wake time (TWT) that suits the data traffic of the first client device. In order to do so, at step 204, the wireless networking device determines a first wake schedule for the first client device based on the first value. In particular, determining a wake schedule may include determining TWT parameters such as wake duration and wake interval. In some examples, the wireless networking device may determine a first wake duration and a first wake interval based on a burst duration and burst interval of the data traffic of the first client device.

Once the first wake duration and the first wake interval are determined, the wireless networking device may negotiate the TWT session with the first client device in compliance with TWT techniques specified in one or more of the IEEE 802.11 Specifications (e.g., the IEEE 802.11ax or IEEE 802.11be Specifications). In an implementation where the first client device supports the R-TWT technique specified in the IEEE 802.11be Specification, the wireless networking device may negotiate an R-TWT session with the first client device.

Typically, in a network, other client devices, such as a second client device (e.g., 106) may connect to the wireless networking device for wireless connectivity. Accordingly, the wireless networking device may also monitor the second client device's data traffic (in a similar fashion as described in conjunction with step 202) to see if the second client device is capable of operating with a TWT technique. Accordingly, at step 206, the wireless networking device may determine a second value of the data traffic character- istic corresponding to a second client device, wherein the second value is different than the first value. In particular, the wireless networking device may analyze, during a second monitoring phase, the data traffic of the second client device by applying deep packet inspection techniques to determine the second value of the data traffic characteristic. The second monitoring phase may overlap, fully or partially, with the first monitoring phase; ends before the start of the first monitoring phase, or starts after the end of the first moni- toring phase.

As the second value is different than the first value, at step 208, the wireless networking device sets a second wake schedule, different than the first wake schedule, for the second client device based on the second value. For example, the values of the burst duration and the burst interval for the first client device may be different in comparison to their values for the second client device. Accordingly, to ensure that the second client device also operates with reduced jitter and in a power-efficient manner, the wireless networking device sets a second wake schedule which is a customized wake schedule for the second client device. In particular, the wireless networking device may determine a second wake duration and a second wake interval for the second client device based on the burst duration and burst interval of the data traffic of the second client device. Once the second wake duration and the second wake interval are determined, the wireless networking device may negotiate the TWT session with the second client device per TWT techniques specified in one or more of the IEEE 802.11 Specifications.

Once the wireless networking device establishes the TWT sessions with the first client device and/or the second client device, the wireless networking device, at step 210, com- municates with the first client device per the first wake schedule and the second client device per the second wake schedule.

Figure 3A:
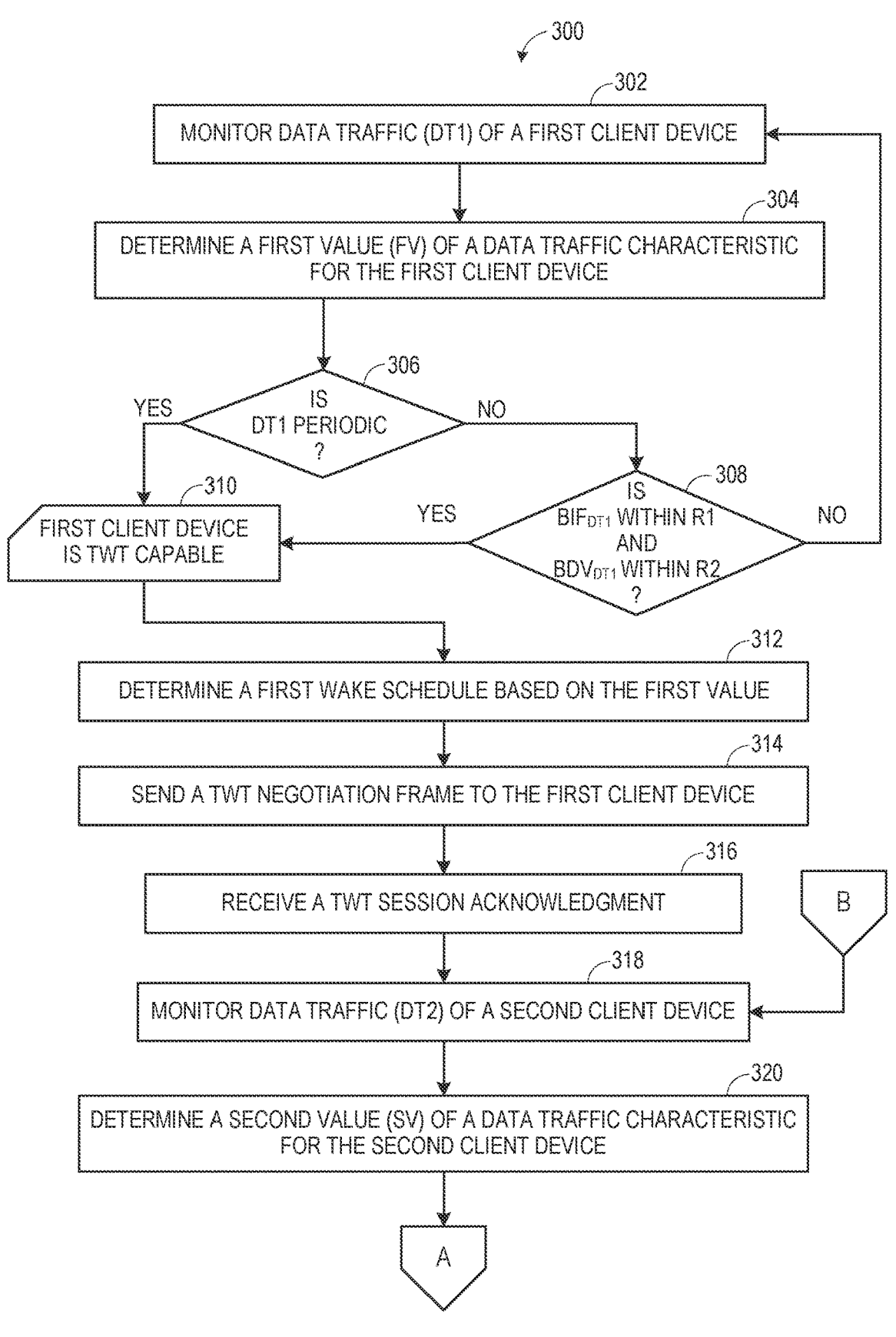
FIGS. 3A-3B depict a flowchart of another example method for setting up customized wake schedules for different client devices based on respective data traffic analysis.
Figure 3B:
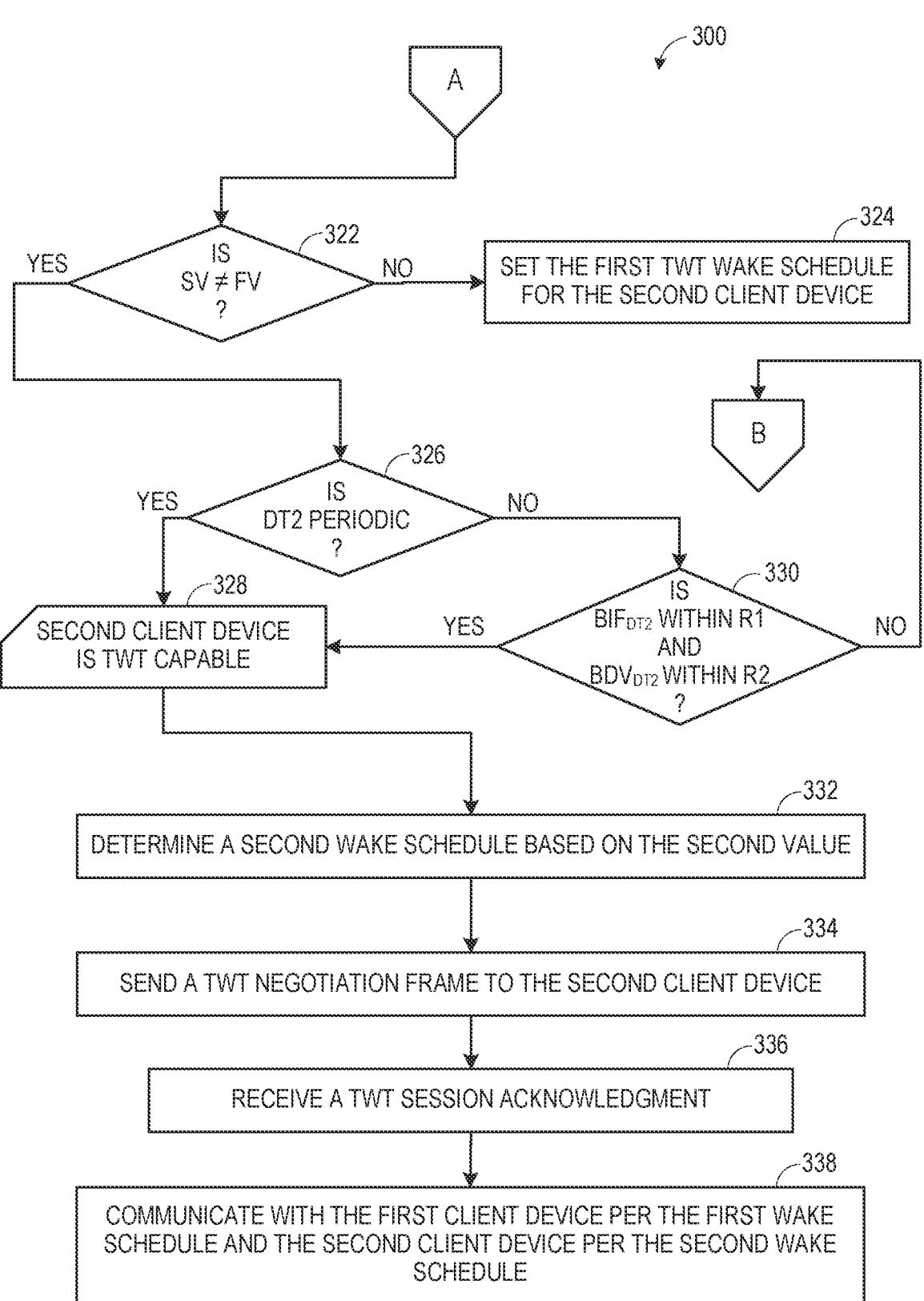

Referring now to FIGS. 3A and 3B, presented is a flowchart of an example method 300 for setting up custom- ized wake schedules for different client devices (e.g., the client devices 104, 106) based on respective data traffic analysis. For the sake of brevity, certain details of operations that are described in any of the previous drawings are not repeated herein.

At step 302, the wireless networking device monitors data traffic associated with a first client device (e.g., the first client device 104) for a certain duration, also, referred to as a first monitoring phase. During the first monitoring phase, the wireless networking device may analyze the data traffic, for example, by applying deep packet inspection techniques. Further, at step 304, the wireless networking device deter- mines a first value of a data traffic characteristic (e.g., burst interval, burst duration, average bandwidth, application type, and/or QoS requirement) based on the monitoring of the data traffic during the first monitoring phase.

Some of these data traffic characteristics are indicative of a periodicity of data traffic and a client device with periodic data traffic is suitable for implementing the TWT technique. Accordingly, at step 306, the wireless networking device performs a check to determine if the data traffic of the first client device (DT1) is periodic during the first monitoring phase. The periodicity of the data traffic may be determined based on the first values of the data traffic characteristics such as the burst interval and the burst duration, hereinafter referred to as a first burst interval and a first burst duration, respectively. In order to check the periodicity of the data traffic, the wireless networking device may determine if the first burst duration and the first burst intervals are uniform during the first monitoring interval. If the first burst duration and the first burst intervals for the data packets in the data traffic are uniform, the wireless networking device may determine that the data traffic of the first client device is periodic (i.e., YES at step 306), and hence the first client device is determined to be TWT capable (see outcome 310).

If the first burst duration and/or the first burst interval for the first client device are non-uniform (i.e., NO at step 306), in some examples, the wireless networking device may allow certain tolerance in the periodicity to implement the TWT with the first client device. In such an implementation, at step 308, the wireless networking device may perform another check to determine whether a burst interval fluctuation in the data traffic of the first client device ($BIF_{DT1}$) is within a first predefined range and a burst duration variance in the data traffic of the first client device ($BDV_{DT1}$) is within a second predefined range (R2). In one example, the term "burst interval fluctuation" as used herein may refer to an average difference between two consecutive burst intervals in a given duration (e.g., the first monitoring phase). Further, in one example, the term "burst duration variance" as used herein may refer to an average difference between the burst sizes of the data packets in the given duration (e.g., the first monitoring phase). If the burst interval fluctuation ($BIF_{DT1}$) is within the first predefined range and the burst duration variance ($BDV_{DT1}$) is within the second predefined range (YES at step 308), the wireless networking device may determine that the first client device is TWT capable (see outcome 310). However, at step 308, if the wireless networking device determines that the burst interval fluctuation ($BIF_{DT1}$) is outside the first predefined range and the burst duration variance ($BDV_{DT1}$) is outside the second predefined range, the wireless networking device determines that the first client device is not suitable for implementing the TWT technique and continues to monitor the data traffic of the associated client devices.

Responsive to determining that the first client device is TWT capable (see outcome 310), the wireless networking device may, at step 312, determine a first wake schedule by calculating first TWT configuration parameters such as a first wake duration and a first wake interval for the first client device based on the first burst duration and the first burst interval, respectively. In some examples, the wireless networking device calculates the first wake interval to be the same as the first burst interval, so that when a TWT feature is implemented for the first client device, the first client device may wake up at the same time the data burst is transmitted/received by the first client device. In an example implementation, if the first client device is a Voice over Internet Protocol (VoIP) device and the burst interval for its data traffic is determined to be 20 milliseconds (ms), the wireless networking device determines the first wake interval to be the same as the burst interval (e.g., 20 ms). Accordingly, the first client device may wake up for communication with the wireless networking device at an interval of every 20 ms.

Also, in some examples, the wireless networking device calculates the first wake duration by adding a margin duration to the first burst duration. Accordingly, the first wake duration may be marginally longer than the first burst duration, allowing the first client device enough time to complete data transfers. In an example implementation, if the burst duration for the data traffic of the first client device is determined to be 3 ms, the wireless networking device determines the first wake duration to be the burst duration (e.g., 3 ms) plus a margin duration (e.g., 1 ms). Accordingly, the first wake duration may be determined as 4 ms, allowing the first client device to fully transmit/receive a traffic burst of 3 ms duration.

In some examples, the margin duration may be determined based on a burst duration value (e.g., the first burst duration). For example, the margin duration may be a predefined percentage of the burst duration value. The predefined percentage may be customizable, and in one example, the predefined percentage may be in a range from about 10% to 30%. In certain other examples, the margin duration may be a fixed or customizable value that is independent of the burst duration value. For instance, the margin duration may be set to 1 ms independent of the burst duration value as used in the example presented hereinabove.

After the TWT parameters are determined, the wireless networking device may negotiate a TWT session with the first client device. The TWT session may be negotiated in compliance with the TWT techniques specified in one or more of the IEEE 802.11 Specifications. In particular, such TWT negotiation may entail the wireless networking device communicating, at step 314, a TWT negotiation frame indicating the first wake interval and the first wake duration to the first client device. Subsequently, at step 316, the wireless networking device may receive a TWT session acknowledgment from the first client device. With the receipt of the TWT session acknowledgment, the first client device is considered configured with the first wake schedule. Accordingly, during the operation thereafter, the first client device is configured to remain active for wireless communication with the wireless networking device during the wake duration at the end of the wake interval. In certain examples, the wireless networking device may as well advertise the wake interval, and the wake duration in one or more beacon frames transmitted to the client devices.

Typically, in a network, other client devices, such as a second client device (e.g., 106) may connect to the wireless networking device for wireless connectivity. Accordingly, the wireless networking device may also monitor, at step 318, data traffic associated with the second client device for a second monitoring phase traffic (in a similar fashion as described in conjunction with step 202) to see if it is capable of implementing a TWT technique. Further, at step 320, the wireless networking device determines a second value of the data traffic characteristic (e.g., one or more of the burst interval, burst duration, average bandwidth, application type, or QoS requirement) based on the monitoring of the data traffic during the second monitoring phase.

Further, at step 322, the wireless networking device performs a check to determine whether the second value is different from the first value. At step 322, if it is determined that the second value is the same as the first value, the wireless networking device, at step 324, may set the first wake schedule with the second client device. In some examples, the wireless networking device may execute processes similar to those described in steps 314 and 316 for the second client device.

However, at step 322, if it is determined that the second value is different from the first value, the wireless networking device, at step 326, performs a check to determine if the data traffic of the second client device is periodic during the second monitoring phase in a similar fashion as described in conjunction with determining periodicity for the first client device. At step 326, if it is determined that the data traffic of the first client device is periodic (i.e., YES at step 326), and the second client device is said to be TWT capable (see outcome 328).

If the data traffic of the second client device is not strictly periodic (i.e., second burst duration and/or the second burst interval for the data packets in the data traffic are nonuniform, NO at step 326), in some examples, the wireless networking device may allow certain tolerance in the periodicity to implement the TWT technique on the second client device. In such an implementation, at step 330, the wireless networking device may perform a check to determine whether a burst interval fluctuation in the data traffic of the second client device ($BIF_{DT2}$) is within the first predefined range (R1) and a burst duration variance in the data traffic of the second client device ($BDV_{DT1}$) is within the second predefined range (R2). If the burst interval fluctuation ($BIF_{DT2}$) is determined to be within the first predefined range and the burst duration variance ($BDV_{DT2}$) is determined to be within the second predefined range (YES at step 330), the wireless networking device may determine that the second client device is TWT capable (see outcome 328). However, at step 330, if the burst interval fluctuation ($BIF_{DT2}$) is determined to be outside the first predefined range and the burst duration variance ($BDV_{DT2}$) is determined to be outside the second predefined range (NO at step 330), the wireless networking device determines that the first client device is not suitable for implementing the TWT technique and continues to monitor the data traffic of the associated client devices.

Responsive to determining that the second client device is also TWT capable (see outcome 328), the wireless networking device may, at step 332, determine a second wake schedule similarly as described in conjunction with the first wake schedule (e.g., in step 312). The second wake schedule may include values of the second TWT configuration parameters such as a second wake duration and a second wake interval determined based on the second burst duration and the second burst interval, respectively. In an example implementation, if the second client device is an IoT device and the burst interval for its data traffic is determined to be 5 ms, the wireless networking device determines the second wake interval to be the same as the burst interval (e.g., 5 ms). Accordingly, the second client device may wake up for communication with the wireless networking device at an interval of every 5 ms. Also, if the burst duration of the second client device is 4 ms, the wireless networking device determines the second wake duration to be the burst duration (e.g., 4 ms) plus the margin duration (e.g., 1 ms). Accordingly, the second wake duration may be determined as 5 ms, allowing the second client device to fully transmit/receive a traffic burst of 4 ms duration.

After the second wake schedule is determined, the wireless networking device may negotiate a TWT session with the second client device in a similar fashion as described in conjunction with negotiating the first wake schedule. For example, at step 334, the wireless networking device sends a TWT negotiation frame specifying the second wake interval and the second wake duration to the second client device. Subsequently, at step 336, the wireless networking device may receive a TWT session acknowledgment from the second client device. With the receipt of the TWT session acknowledgment, the second client device is considered configured with the second wake schedule. Accordingly, during the operation thereafter, the second client device is configured to remain active for wireless communication with the wireless networking device during the second wake duration at the end of the second wake interval. In certain examples, the wireless networking device may as well advertise the second wake interval, and the second wake duration in one or more beacon frames transmitted to the client devices.

Once the wireless networking device establishes the TWT sessions with the first client device and/or the second client device, the wireless networking device, at step 338, communicates with the first client device per the first wake schedule and the second client device per the second wake schedule.

Figure 4:
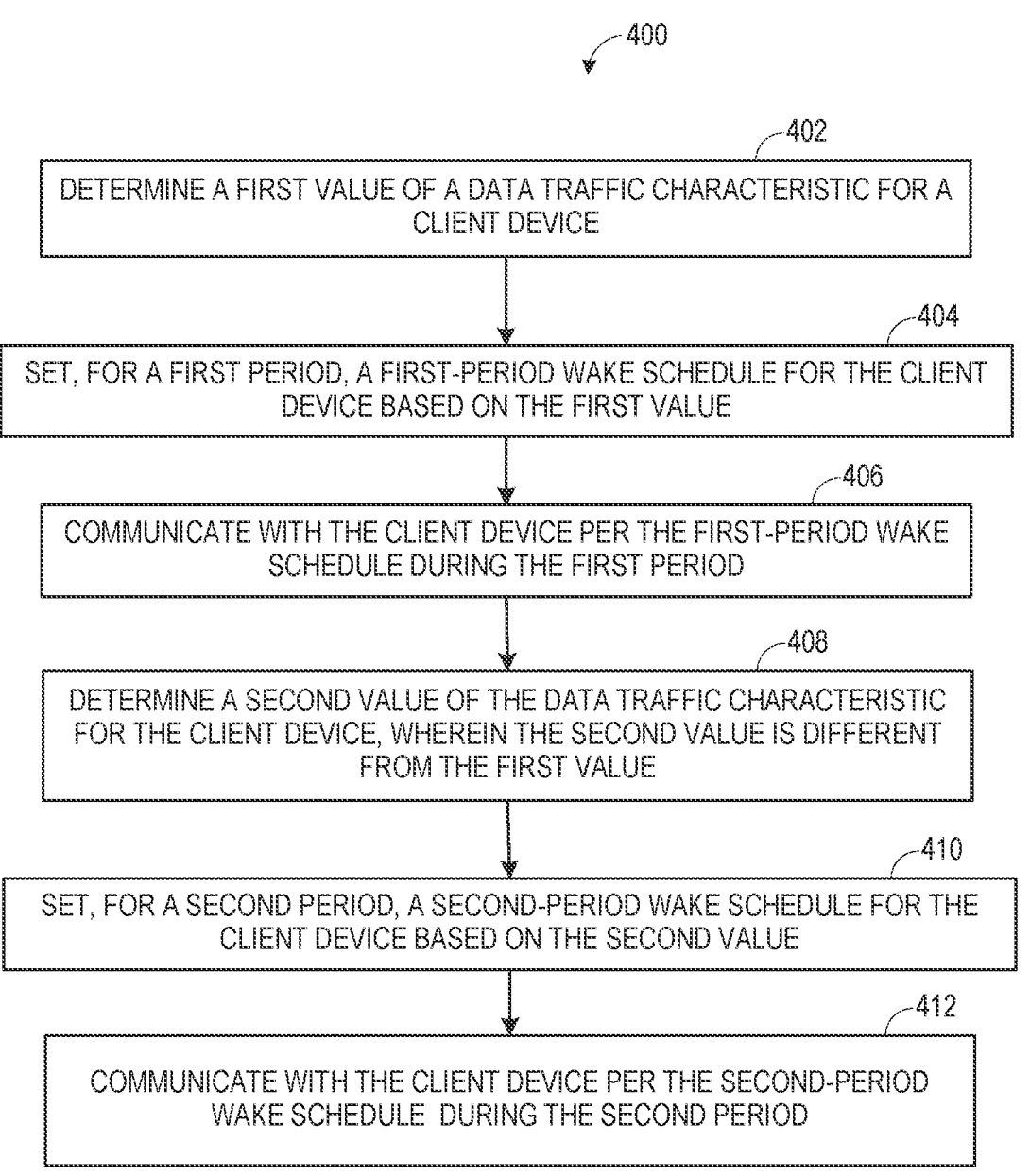
FIG. 4 depicts a flowchart of another example method for setting up customized wake schedules for different periods for a client device.

A client device may run different applications at different periods. Depending on the type of an application running at a given duration, the data traffic pattern of the client device may vary causing different values of the same data traffic characteristic for the same client device. In such cases, it will be useful to dynamically update the wake schedules of the client device in response to detecting a change in the data traffic pattern. FIG. 4 depicts a flowchart of one such example method 400 for setting up custom wake schedules for a client device during different periods. For the sake of brevity, certain details of operations that are described in any of the previous drawings are not repeated herein.

At step 402, the wireless networking device determines a value of a data traffic characteristic corresponding to a client device (e.g., the client devices 104) by inspecting the data traffic of the client device. The data traffic characteristic may be any or more of the burst interval, burst duration, average bandwidth, application type, QoS requirement. The value of the data traffic characteristic determined at step 402 is hereinafter referred to as a first-period traffic characteristic value (FPTCV). The wireless networking device may determine the first-period traffic characteristic value by monitoring the data traffic of the client device.

Based on the first-period traffic characteristic value, if the client device is found to be TWT capable, at step 404, the wireless networking device sets a wake schedule for a first-period based on the first-period traffic characteristic value. Such wake schedule set for the first-period is hereinafter referred to as a first-period wake schedule. In particular, to set the first-period wake schedule, the wireless networking device may determine a first-period TWT parameters such as a first-period wake interval and a first-period wake duration based on the first-period traffic characteristic value (e.g., one or more of the values of the burst interval and the burst duration measured during the monitoring phase). Once the first-period TWT parameters are determined, the wireless networking device may negotiate the first-period wake schedule with the client device in accordance with the TWT techniques specified in the IEEE 802.11 Specifications. Details of negotiating a wake schedule have been in the description above.

After the first-period wake schedule is set, the wireless networking device, at step 406, may communicate with the client device per the first-period wake schedule during the first period. In particular, based on the set first-period wake schedule, the client device may wake up at every first-period wake interval for a first-period wake duration for data communication with the wireless networking device.

Further, during the operation, the wireless networking device may continuously monitor the data traffic of the client device. Based on the monitoring, at step 408, the wireless networking device may again determine a value of the data traffic characteristic corresponding to the client device which is different than the first-period traffic characteristic value (e.g., the value of the data traffic characteristic determined at step 402). The value of the data traffic characteristic determined at step 408 is hereinafter referred to as a second-period traffic characteristic value (SPTCV).

Based on the second-period traffic characteristic value, if the client device is found to be TWT capable even for the changed data traffic pattern, at step 410, the wireless networking device sets a wake schedule for a second period based on the second-period traffic characteristic value. The wake schedule that is set for the second period is hereinafter referred to as a second-period wake schedule which is different than the first-period wake schedule. In particular, to set the second-period wake schedule, the wireless networking device may determine second-period TWT parameters such as a second-period wake interval and a second-period wake duration based on the second-period traffic characteristic value (e.g., one or more of the values of the burst interval and the burst duration measured at step 408). Once the second-period TWT parameters are determined, the wireless networking device may negotiate the second-period wake schedule with the client device in accordance with TWT techniques specified in the IEEE 802.11 Specifications. Details of negotiating awake schedule have been in the description above.

After the second-period wake schedule is set, the wireless networking device, at step 412, may communicate with the client device per the second-period wake schedule during the second period. In particular, based on the set second-period wake schedule, the client device may wake up at every second-period wake interval for a second-period wake duration for data communication with the wireless networking device.

Figure 5A:
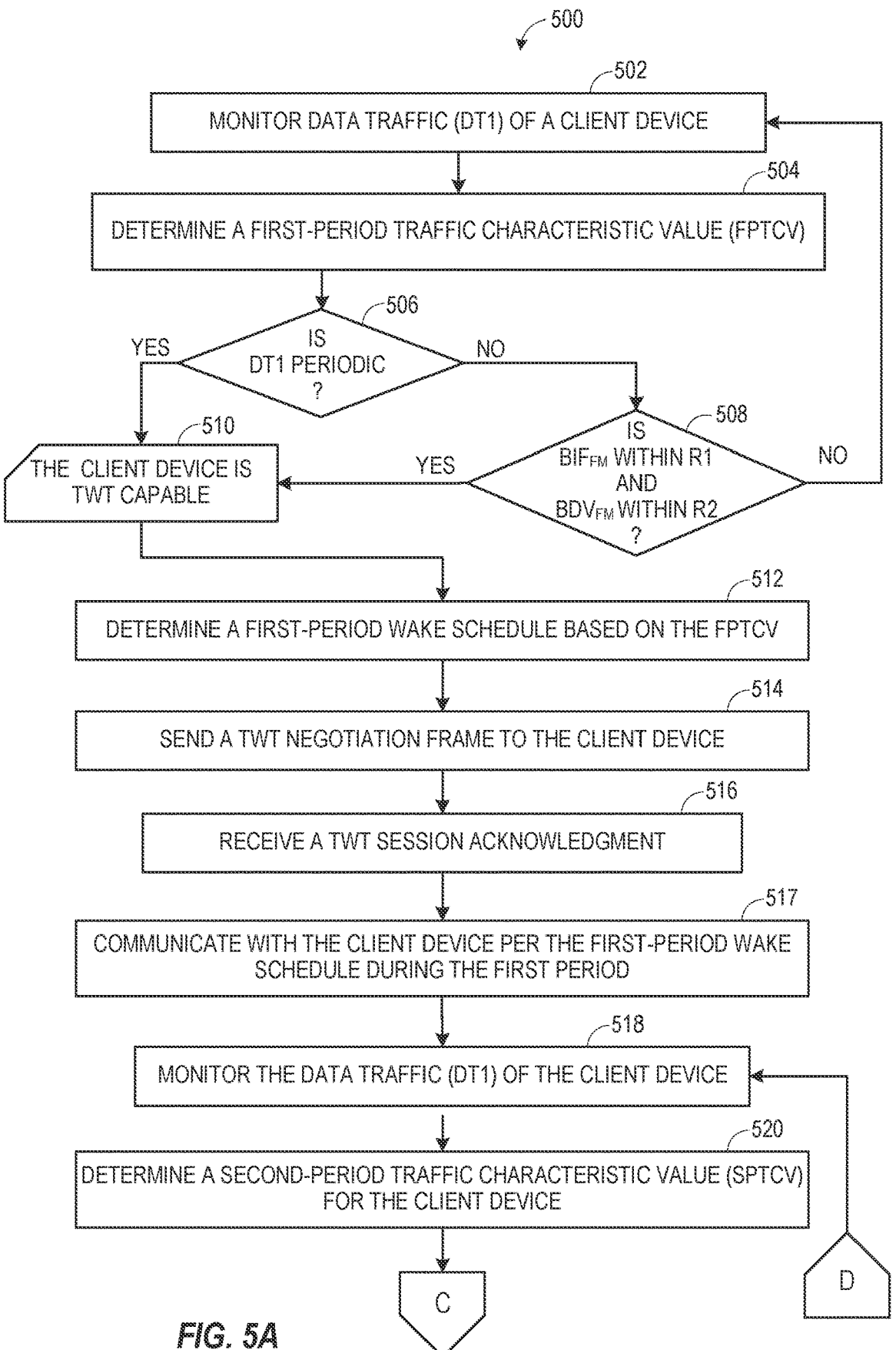
FIGS. 5A-5B depict a flowchart of yet another example method for setting up customized wake schedules for different periods for a client device.
Figure 5B:
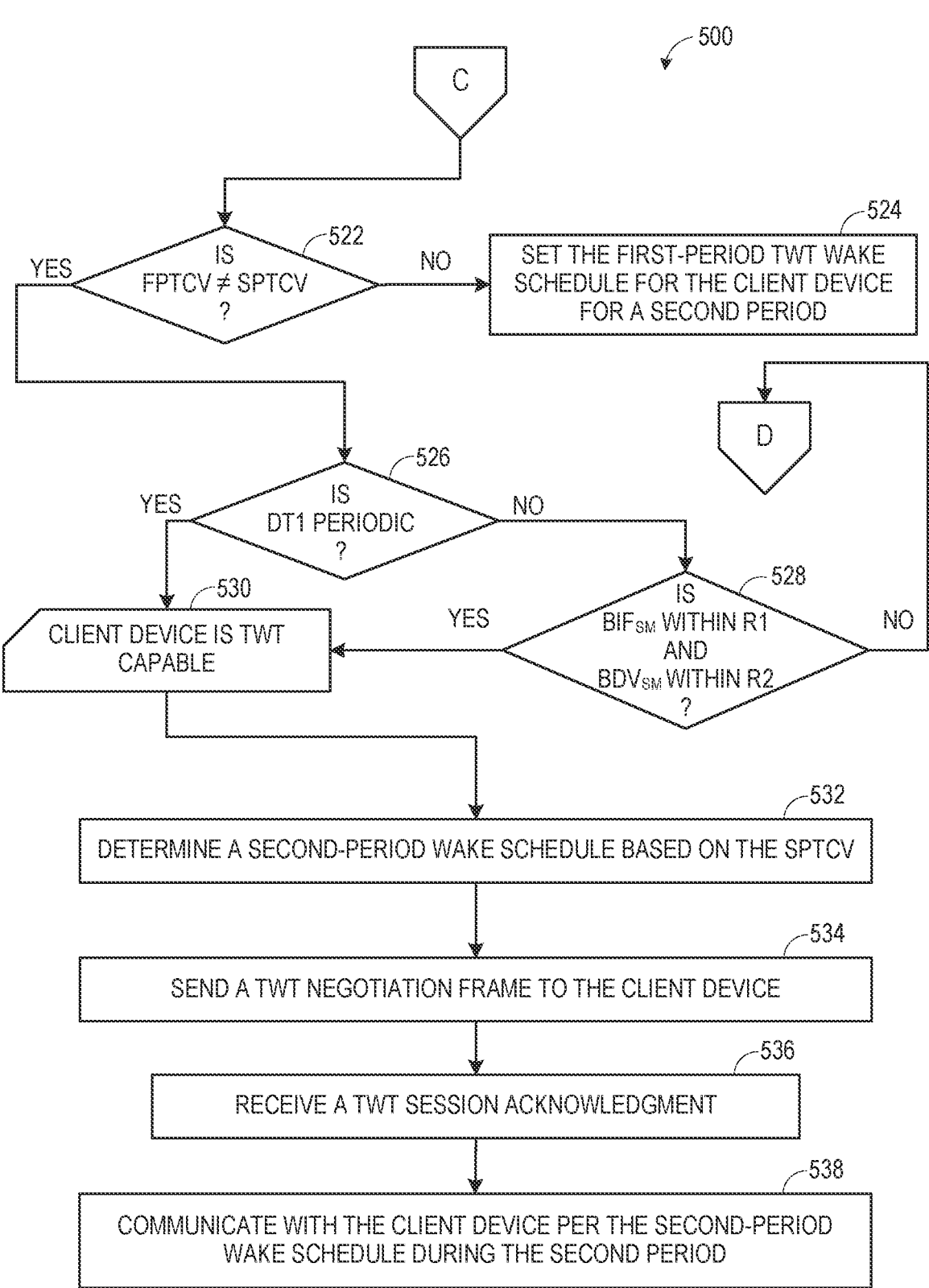

Referring now to FIGS. 5A and 5B, presented is a flowchart of an example method 500 for setting up custom wake schedules for a client device during different periods. In particular, the method 500 may be an example representative of the method 400 of FIG. 4 and may include certain additional steps and provide additional information/features about details already captured in FIG. 4. For the sake of brevity, certain details of operations that are described in any of the previous drawings are not repeated herein.

At step 502, the wireless networking device monitors data traffic (DT1) associated with a client device (e.g., the client device 104) for a certain duration to analyze the data traffic, for example, by applying deep packet inspection techniques. Further, at step 504, the wireless networking device determines a value of a data traffic characteristic (also referred to as first-period traffic characteristic value (FPTCV)) based on the monitoring of the data traffic during the first monitoring phase. The first-period traffic characteristic value may be a value of one or more of the burst interval, burst duration, average bandwidth, application type, and/or QoS requirement.

Further, at step 506, the wireless networking device performs a check to determine if the data traffic of the client device is periodic based on the first-period traffic characteristic value. In order to check the periodicity of the data traffic, the wireless networking device may determine if the values of the burst duration and the first burst intervals are uniform in the data traffic of the client device. If the values of burst duration and the burst intervals for the data packets in the data traffic are uniform, the wireless networking device may determine that the data traffic of the client device is periodic (i.e., YES at step 506), and hence the client device is TWT capable (see outcome 510).

If the burst duration and/or the burst interval for the data packets in the data traffic are non-uniform (i.e., NO at step 506), in some examples, the wireless networking device may allow certain tolerance in the periodicity to implement the TWT with the client device. In such an implementation, at step 508, the wireless networking device may perform another check to determine whether a burst interval fluctuation in the data traffic based on a first monitoring (e.g., monitoring at step 502) ($BIF_{FM}$) is within a first predefined range (R1) and a burst duration variance in the data traffic based on the first monitoring ($BDV_{FM}$) is within a second predefined range (R2). If the burst interval fluctuation ($BIF_{FM}$) is within the first predefined range and the burst duration variance ($BDV_{FM}$) is within the second predefined range (YES at step 508), the wireless networking device may determine that the client device is TWT capable (see outcome 510). However, at step 508, if the wireless networking device determines that the burst interval fluctuation ($BIF_{FM}$) is outside the first predefined range and the burst duration variance ($BDV_{FM}$) is outside the second predefined range, the wireless networking device determines that the client device is not suitable for implementing the TWT technique and continues to monitor the data traffic of the associated client devices.

Responsive to determining that the client device is TWT capable (see outcome 510), the wireless networking device may, at step 512, determine a first-period wake schedule by calculating first-period TWT configuration parameters such as a first-period wake duration and a first-period wake interval for the client device based on the values of the burst duration and the burst interval, respectively, determined at step 504. The first-period wake duration and a first-period wake interval may be determined in a similar way as described in conjunction with method 300.

After the first-period TWT parameters are determined, the wireless networking device may negotiate a first-period TWT session with the client device. The TWT session may be negotiated in compliance with the TWT techniques specified in one or more of the IEEE 802.11 Specifications. In particular, such TWT negotiation may entail the wireless networking device communicating, at step 514, a TWT negotiation frame indicating the first-period wake interval and the first-period wake duration to the client device. Subsequently, at step 516, the wireless networking device may receive a TWT session acknowledgment from the client device. With the receipt of the TWT session acknowledgment, the client device is said to have been configured with the first-period wake schedule. In certain examples, the wireless networking device may as well advertise the first-period wake interval and the first-period wake duration in one or more beacon frames transmitted to the client devices.

After the first-period wake schedule is negotiated, the wireless networking device, at step 517, may communicate with the client device per the first-period wake schedule during the first period. In particular, based on the set first-period wake schedule, the client device may wake up at every first-period wake interval for a first-period wake duration for data communication with the wireless networking device.

Further, during the operation, the wireless network device may continuously monitor the data traffic of the client device, see step 518, to ascertain if there is any change in the data traffic pattern of the client device and whether the wake schedule needs to be changed. Further, at step 520, the wireless networking device determines a value of the data traffic characteristic based on the monitoring of the data traffic. The value of the data traffic characteristic determined at step 520 is hereinafter referred to as a second-period traffic characteristic value (SPTCV). Examples of the second-period traffic characteristic value may be a second-period burst duration and a second-period burst interval, or any values of the QoS requirement, application type, and/or average bandwidth determined at step 520.

Further, at step 522, the wireless networking device performs a check to determine whether the second-period traffic characteristic value is different from the first-period traffic characteristic value. At step 522, if it is determined that the second-period traffic characteristic value is the same as the first-period traffic characteristic value, the wireless networking device, at step 524, may negotiate the first-period wake schedule with the client device. In some examples, the wireless networking device may execute processes similar to those described in steps 514 and 516.

Returning to however, at step 522, if it is determined that the second-period traffic characteristic value is different from the first-period traffic characteristic value, the wireless networking device, at step 526, performs a check to determine if the data traffic of the client device is periodic based on the second-period traffic characteristic value (e.g., the second-period burst duration and the second-period burst interval) in a similar fashion as described earlier. At step 526, if it is determined that the data traffic of the client device is periodic (i.e., YES at step 526), the client device is determined to be TWT capable (see outcome 530). If the data traffic of the client device is not strictly periodic (i.e., the second-period burst duration and the second-period burst interval in the data traffic are non-uniform, NO at step 526), in some examples, the wireless networking device may allow certain tolerance in the periodicity to implement the TWT with the client device. In such an implementation, at step 528, the wireless networking device may perform a check to determine whether a burst interval fluctuation in the data traffic of the client device based on a second monitoring (e.g., monitoring at step 518) (BIF$_{SM}$) is within the first predefined range (R1) and a burst duration variance in the data traffic based on a second monitoring (BDV$_{SM}$) is within the second predefined range (R2). If the burst interval fluctuation (BIF$_{SM}$) is determined to be within the first predefined range and the burst duration variance (BDV$_{SM}$) is determined to be within the second predefined range (YES at step 528), the wireless networking device may determine that the client device is TWT capable (see outcome 530). However, at step 528, if the burst interval fluctuation (BIF$_{SM}$) is outside the first predefined range and the burst duration variance (BDV$_{SM}$) is outside the second predefined range, the wireless networking device determines that the client device is not suitable for implementing the TWT technique and continues to monitor the data traffic of the associated client devices.

Responsive to determining that the client device is also TWT capable (see outcome 530) based on the second-period traffic characteristic value, the wireless networking device may, at step 532, determine a second-period wake schedule similarly as described in conjunction with the first-period wake schedule (e.g., in step 512). The second-period wake schedule may include values of the second-period TWT configuration parameters such as a second-period wake duration and a second-period wake interval determined based on the second-period burst duration and the second-period burst interval, respectively.

After the second-period wake schedule is determined, the wireless networking device may negotiate a TWT session with the client device in a similar fashion as described in conjunction with negotiating the first-period wake schedule. For example, at step 534, the wireless networking device sends a TWT negotiation frame specifying the second-period wake interval and the second-period wake duration to the client device. Subsequently, at step 536, the wireless networking device may receive a TWT session acknowledgment from the client device. With the receipt of the TWT session acknowledgment, the client device is considered configured with the second-period wake schedule. Accordingly, during the operation thereafter, the client device is configured to remain active for wireless communication with the wireless networking device during the second-period wake duration at the end of the second-period wake interval.

After the second-period wake schedule is set, the wireless networking device, at step 538, may communicate with the client device per the second-period wake schedule during the second period. In particular, based on the set second-period wake schedule, the client device may wake up at every second-period wake interval for a second-period wake duration for data communication with the wireless networking device.

Figure 6:
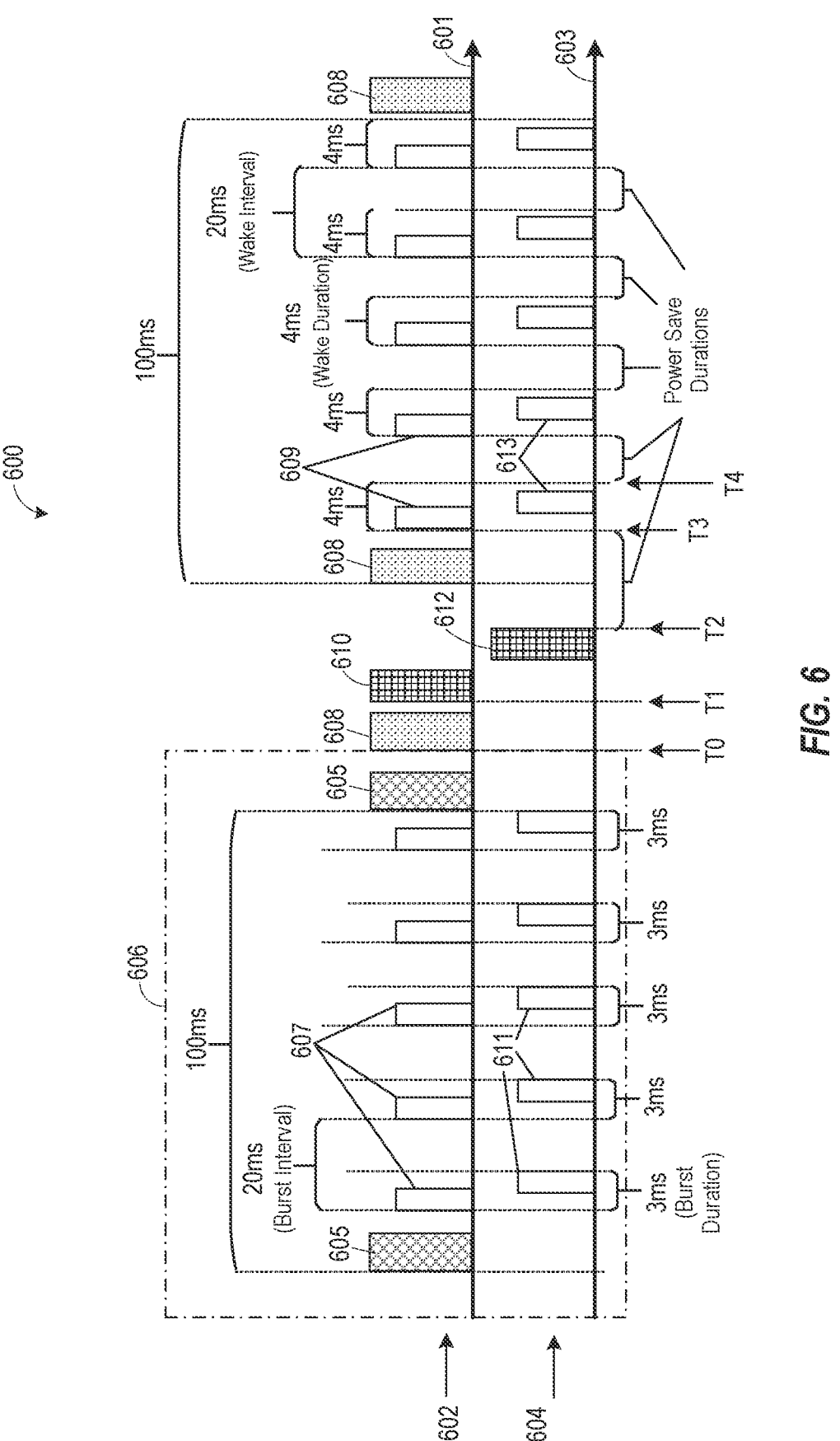
FIG. 6 depicts an example frame sequence for setting up a wake schedule for a client device.

FIG. 6 depicts an example frame sequence 600 for setting up a wake schedule for a client device (e.g., a client device 104 shown in FIG. 1) by a wireless networking device (e.g., the wireless networking device 102 shown in FIG. 1). In particular, the example frame sequence 600 of FIG. 6 may be representative of data traffic for a client device (e.g., a VoIP phone). The frame sequence 600 depicts two traffic types, for example, a downlink (DL) traffic 602 (indicative of data traffic from a wireless network device to the client device) and an uplink (UL) traffic 604 (indicative of data traffic from the client device to the wireless network device) shown over timelines 601 and 603, respectively. The DL traffic 602 may include beacons (e.g., beacons 605 and 608) and, traffic units (e.g., data traffic units 607 and 609), and other management traffic (e.g., not shown). Further, the UL traffic 604 may include data traffic units 611 and 613, and other management traffic (not shown). It may be understood although several of the beacons and data traffic units are marked with the same reference numerals, the content of such beacons and data traffic units may be different.

After the client device is associated with the wireless networking device, the wireless networking device starts to analyze the DL traffic 602 and the UL traffic 604 of the client device during a monitoring phase 606. Based on the data traffic analysis during the monitoring phase 606, the wireless network device may determine the burst duration and the burst interval for the client device are 3 ms and 20 ms, respectively. Also, the wireless network device may determine that the DL traffic 602 and the UL traffic 604 are periodic with stable traffic burst duration of 3 ms and traffic burst interval of 20 ms. Based on the traffic burst duration of 3 ms and traffic burst interval of 20 ms, the wireless network device may determine a TWT wake duration and a TWT wake interval for the client device as 4 ms and 20 ms, respectively, in a similar fashion as described earlier.

In the frame sequence 600, time TO marks the end of the monitoring phase 606. Accordingly, at time TO, the wireless networking device may send a beacon 608. The beacon 608 may include a TWT element (e.g., an R-TWT element) specifying the TWT wake duration and the TWT wake interval for the client device. Further, at time T1, the wireless networking device sends send a TWT negotiation action frame 610. In an example implementation, the TWT negotiation action frame 610 may include a broadcast TWT Parameter Set field, specify a negotiation type=3 in the control field of the TWT element, and specify an accept condition (e.g., Accept TWT) for a TWT Setup Command field. Further, the TWT negotiation action frame 610 may specify a TWT wake duration field and the TWT wake interval field as 4 ms and 20 ms, respectively. Also, the target wake time may be set to a client device STA wake-up time point at T3.

Further, at time T2, after the client device completes sending a TWT session acknowledgment frame 612 to the wireless networking device and enters into power save mode. Furthermore, at time T3, the client device wakes up to receive and send the packets. At time T4, the client device finished the DL and UL traffic burst communications, enters into the power save mode, and again waits for the next wake-up time point. Intervals between each wake duration are marked as power-save durations in which the client device may enter into the power-save mode. A duration for which the client device may remain into the power-save mode is referred to as a power save duration. Several such power save durations are also marked in FIG. 6. In some examples, the client device when operating in the power-save mode, may disable its data communication circuits to stop data communication with the wireless networking device.

Figure 7:
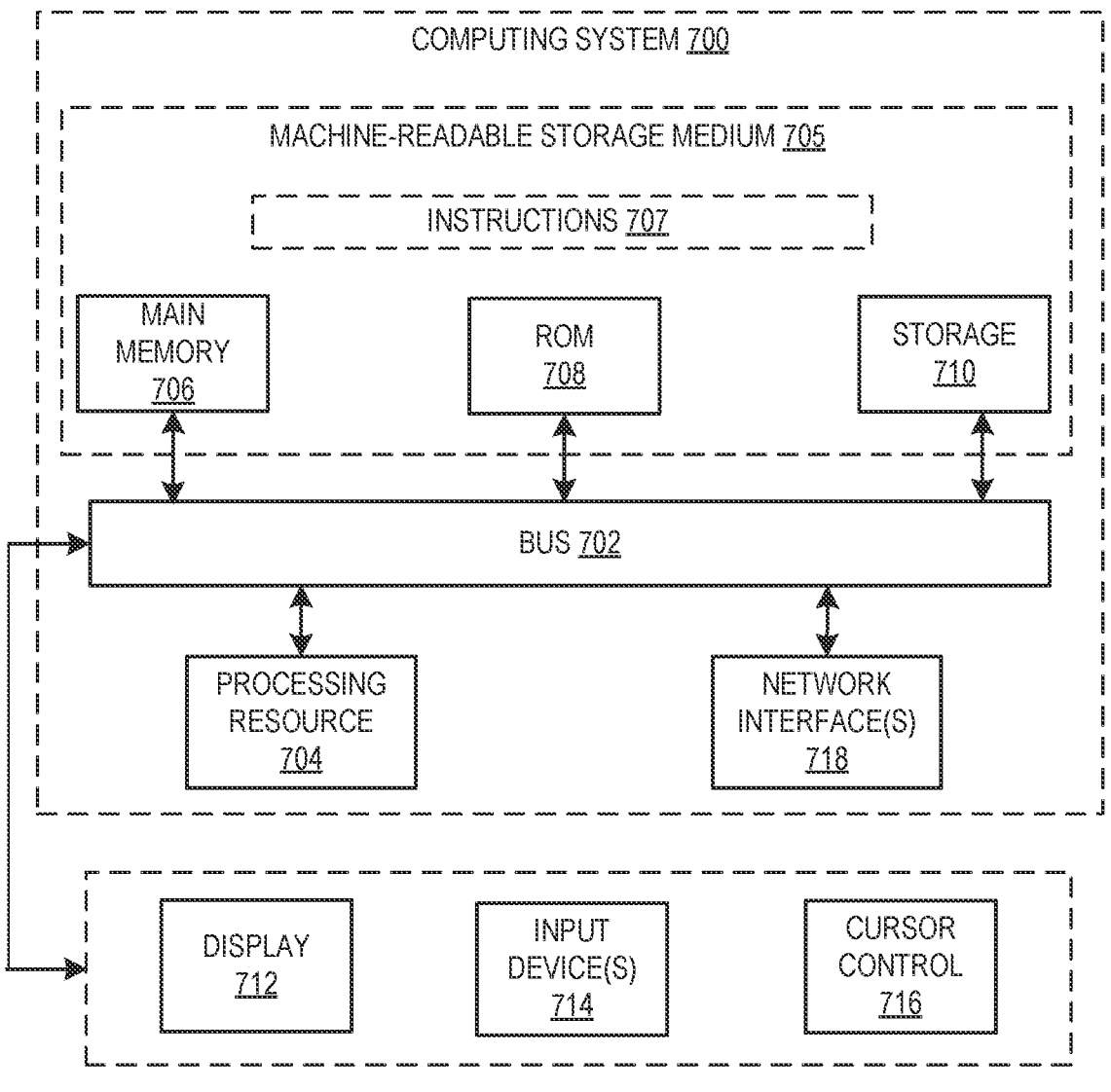
FIG. 7 depicts a block diagram of an example computing system.

FIG. 7 depicts a block diagram of an example computing system 700 in which various of the examples described herein may be implemented. In some examples, the computing system 700 may be configured to operate as a wireless networking device, such as the wireless networking device 102 of FIG. 1, and can perform various operations described in conjunction with one or more of the earlier drawings. In some other examples, the computing system 700 may be configured to operate as a wireless networking device, such as the wireless networking device 102 of FIG. 1, and can perform various operations described in one or more of the earlier drawings. Examples of the devices and/or systems that may be implemented as the computing system 700 may include, desktop computers, laptop computers, servers, web servers, authentication servers, AAA servers, DNS servers, DHCP servers, IP servers, VPN servers, network policy servers, mainframes, tablet computers, e-readers, netbook computers, televisions and similar monitors (e.g., smart TVs), content receivers, set-top boxes, PDAs, mobile phones, smartphones, smart terminals, dumb terminals, virtual terminals, video game consoles, virtual assistants, IoT devices, and the like.

The computing system 700 may include a bus 702 or other communication mechanisms for communicating information, a hardware processor, also referred to as processing resource 704, and a machine-readable storage medium 705 coupled to the bus 702 for processing information. In some examples, the processing resource 704 may include one or more CPUs, semiconductor-based microprocessors, and/or other hardware devices suitable for retrieval and execution of instructions stored in the machine-readable storage medium 705. The processing resource 704 may fetch, decode, and execute instructions to manage the transmit powers of wireless networking devices. As an alternative or in addition to retrieving and executing instructions, the processing resource 704 may include one or more electronic circuits that include electronic components for performing the functionality of one or more instructions, such as an FPGA, an ASIC, or other electronic circuits.

In some examples, the machine-readable storage medium 705 may include a main memory 706, such as a RAM, cache and/or other dynamic storage devices, coupled to the bus 702 for storing information and instructions to be executed by the processing resource 704. The main memory 706 may also be used for storing temporary variables or other intermediate information during the execution of instructions to be executed by the processing resource 704. Such instructions, when stored in storage media accessible to the processing resource 704, render the computing system 700 into a special-purpose machine that is customized to perform the operations specified in the instructions. The machine-readable storage medium 705 may further include a read-only memory (ROM) 708 or other static storage device coupled to the bus 702 for storing static information and instructions for the processing resource 704. Further, in the machine-readable storage medium 705, a storage device 710, such as a magnetic disk, optical disk, or Universal Serial Bus (USB) thumb drive (Flash drive), etc., may be provided and coupled to the bus 702 for storing information and instructions.

In some examples, the computing system 700 may be coupled, via the bus 702, to a display 712, such as a liquid crystal display (LCD) (or touch-sensitive screen), for displaying information to a computer user. In some examples, an input device 714, including alphanumeric and other keys (physical or software generated and displayed on a touch-sensitive screen), may be coupled to the bus 702 for communicating information and command selections to the processing resource 704. Also, in some examples, another type of user input device such as a cursor control 716 may be connected to the bus 702. The cursor control 716 may be a mouse, a trackball, or cursor direction keys. The cursor control 716 may communicate direction information and command selections to the processing resource 704 for controlling cursor movement on the display 712. In some other examples, the same direction information and command selections as cursor control may be implemented via receiving touches on a touch screen without a cursor.

In some examples, the computing system 700 may include a user interface module to implement a Graphical User Interface (GUI) that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 700 also includes a network interface 718 coupled to bus 702. The network interface 718 provides a two-way data communication coupling to one or more network links that are connected to one or more local networks. For example, the network interface 718 may be an integrated services digital network (ISDN) card, cable modem, satellite modem, or a modem to provide a data communication connection to a corresponding type of telephone line. As another example, the network interface 718 may be a local area network (LAN) card or a wireless communication unit (e.g., Wi-Fi chip/module).

In some examples, the machine-readable storage medium 705 (e.g., one or more of the main memory 706, the ROM 708, or the storage device 710) stores instructions 707 which when executed by the processing resource 704 may cause the processing resource 704 to execute one or more of the methods/operations described hereinabove. The instructions 707 may be stored on any of the main memory 706, the ROM 708, or the storage device 710. In some examples, the instructions 707 may be distributed across one or more of the main memory 706, the ROM 708, or the storage device 710. In some examples, the instructions 707 may include instructions that when executed by the processing resource 704 may cause the processing resource 704 to perform one or more of the methods described in FIGS. 2, 3A, 3B, 4, 5A, and 5B.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, third, etc., may be used herein to describe various elements, these elements should not be limited by these terms, as these terms are only used to distinguish one element from another unless stated otherwise or the context indicates otherwise.

What is claimed is:

1. A method comprising:

determining, by a wireless networking device, a first value of a data traffic characteristic corresponding to a first client device, wherein the data traffic characteristic is indicative of periodicity of data traffic;

determining, based on the first value, whether the first client device is capable of implementing a target wake time (TWT) mechanism;

determining, by the wireless networking device, a second value of the data traffic characteristic corresponding to a second client device, wherein the second value is different than the first value;

determining, based on the second value, whether the second client device is capable of implementing the TWT mechanism;

at least one of setting, by the wireless networking device and responsive to determining that the first client device is capable of implementing the TWT mechanism, a first wake schedule for the first client device based on the first value, and setting, by the wireless networking device and responsive to determining that the second client device is capable of implementing the TWT mechanism, a second wake schedule for the second client device based on the second value, wherein the second wake schedule is different than the first wake schedule; and communicating, by the wireless networking device, with the first client device per the first wake schedule and the second client device per the second wake schedule.

2. The method of claim 1, wherein the data traffic characteristic comprises one or more of a burst interval, a burst duration, an average bandwidth, an application type, or a quality of service (QoS) requirement.

3. The method of claim 1, wherein setting the first wake schedule comprises negotiating a first target wake time (TWT) session with the first client device, and wherein setting the second wake schedule comprises negotiating a second TWT session with the second client device, and wherein the first TWT session and the second TWT session are negotiated in accordance with a TWT technique specified in one or more of the Institute of Electrical and Electronics Engineers (IEEE) 802.11 Specifications.

4. The method of claim 3, wherein determining whether the first client device or the second client device is capable of implementing the TWT mechanism comprises performing one or more of:

determining that the data traffic is periodic; or determining that a burst interval fluctuation in the data traffic is within a first predefined range and a burst duration variance is within a second predefined range.

5. The method of claim 1, further comprising determining, by the wireless networking device, a wake interval and a wake duration for the first client device or the second client device based on respective burst interval and burst duration.

6. The method of claim 5, wherein the wake interval is set the same as the burst interval, and the wake duration is set higher than the burst duration.

7. The method of claim 5, wherein negotiating the first TWT session comprises:

communicating, by the wireless networking device, a TWT negotiation frame indicating the wake interval and the wake duration to the first client device; and receiving, by the wireless networking device, a TWT session acknowledgment from the first client device, wherein responsive to sending the TWT session acknowledgment, the first client device is configured to remain active for wireless communication with the wireless networking device during the wake duration at an end of the wake interval.

8. The method of claim 5, further comprising advertising, by the wireless networking device, the wake interval, and the wake duration in a beacon frame.

9. The method of claim 3, wherein the first TWT session negotiated as per a restricted TWT (R-TWT) technique specified in the IEEE 802.11be Specification responsive to determining that the first client device supports the R-TWT technique, and the second TWT session negotiated as per the R-TWT technique responsive to determining that the second client device supports the R-TWT technique.

10. A method comprising:

determining, by a wireless networking device, a first value of a data traffic characteristic corresponding to a client device;

determining, for a first-period and based on the first value, whether the client device is capable of implementing a target wake time (TWT) mechanism;

setting, for the client device by the wireless networking device, a first wake schedule for the first-period based on the first value;

communicating, by the wireless networking device, with the client device per the first wake schedule during the first-period;

determining, by the wireless networking device, a second value of the data traffic characteristic corresponding to the client device, wherein the second value is different than the first value;

determining, for a second-period and based on the second value, whether the client device is capable of implementing the TWT mechanism;

setting, for the client device by the wireless networking device, a second wake schedule for the second-period based on the second value, wherein the second wake schedule is different than the first wake schedule; and communicating, by the wireless networking device, with the client device per the second wake schedule during the second-period.

11. The method of claim 10, wherein the first-period and the second-period are non-overlapping.

12. The method of claim 10, wherein determining that the client device is capable of implementing the TWT mechanism comprises one or more of:

determining that the data traffic is periodic; or determining that a burst interval fluctuation in the data traffic is within a first predefined range and a burst duration variance is within a second predefined range.

13. The method of claim 12, further comprising determining, by the wireless networking device for the first-period or the second-period, a wake interval and a wake duration for the client device based on respective burst interval and burst duration.

14. The method of claim 13, wherein negotiating a TWT session for the first-period or the second-period comprises:

communicating, by the wireless networking device, a TWT negotiation frame indicating the wake interval and the wake duration to the client device; and receiving, by the wireless networking device, a TWT session acknowledgment from the client device, wherein responsive to sending the TWT session acknowledgment, the client device is configured to remain active for wireless communication with the wireless networking device during the wake duration at an end of the wake interval.

15. A wireless networking device comprising:

a machine-readable storage medium storing instructions; and a processing resource coupled to the machine-readable storage medium and configured to execute one or more of the instructions to:

determine a first value of a data traffic characteristic corresponding to a first client device, wherein the data traffic characteristic is indicative of periodicity of data traffic;

determine, based on the first value, whether the first client device is capable of implementing a target wake time (TWT) mechanism;

determine a second value of the data traffic characteristic corresponding to a second client device, wherein the second value is different than the first value;

determine, based on the second value, whether the second client device is capable of implementing the TWT mechanism;

at least one of set, responsive to determining that the first client device is capable of implementing the TWT mechanism, a first wake schedule for the first client device based on the first value, and set, responsive to determining that the second client device is capable of implementing the TWT mechanism, a second wake schedule for the second client device based on the second value, wherein the second wake schedule is different than the first wake schedule; and communicate with the first client device per the first wake schedule and the second client device per the second wake schedule.

16. The wireless networking device of claim 15, wherein the data traffic characteristic comprises one or more of a burst interval, a burst duration, an average bandwidth, an application type, or a QoS requirement.

17. The wireless networking device of claim 15, wherein responsive to determining that the first client device or the second client device is capable of implementing the TWT mechanism, the processing resource is configured to execute one or more of the instructions to:

communicate a TWT negotiation frame indicating a wake interval and a wake duration to the first client device or the second client device; and receive a TWT session acknowledgment from the first client device or the second client device, wherein responsive to sending the TWT session acknowledgment the first client device or the second client device is configured to remain active for wireless communication with the wireless networking device during the wake duration at an end of the wake interval.

* * * * *